(12) United States Patent
Oswald et al.

(10) Patent No.: US 7,863,386 B2
(45) Date of Patent: Jan. 4, 2011

(54) LOW DENSITY ETHYLENIC POLYMER COMPOSITION AND METHOD OF MAKING THE SAME

(75) Inventors: Thomas Oswald, Lake Jackson, TX (US); Christopher R. Eddy, Missouri City, TX (US); Andrea M. Rhodius, Capfed (AR); Christopher W. Conrad, Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 155 days.

(21) Appl. No.: 11/817,231

(22) PCT Filed: Mar. 3, 2006

(86) PCT No.: PCT/US2006/007588

§ 371 (c)(1),
(2), (4) Date: Aug. 28, 2007

(87) PCT Pub. No.: WO2006/096504

PCT Pub. Date: Sep. 14, 2006

(65) Prior Publication Data

US 2008/0255302 A1  Oct. 16, 2008

Related U.S. Application Data

(60) Provisional application No. 60/658,962, filed on Mar. 4, 2005.

(51) Int. Cl.
*C08L 23/04* (2006.01)
*C08F 110/02* (2006.01)

(52) U.S. Cl. .......... 525/240; 526/227; 526/352; 526/315; 526/326; 526/316; 526/219.6; 526/64; 526/352.2; 525/191; 525/52; 525/242; 524/272; 524/274

(58) Field of Classification Search .......... 526/227, 526/352, 315, 326, 316, 219.6, 64, 352.2; 525/191, 52, 240, 242; 524/272, 274
See application file for complete search history.

(56) References Cited

U.S. PATENT DOCUMENTS

| | | | |
|---|---|---|---|
| 3,645,992 A | 2/1972 | Elston | |
| 3,914,342 A | 10/1975 | Mitchell | |
| 4,076,698 A | 2/1978 | Anderson et al. | |
| 4,599,392 A | 7/1986 | McKinney et al. | |
| 5,272,236 A | 12/1993 | Lai et al. | |
| 5,278,272 A | 1/1994 | Lai et al. | |
| 5,582,923 A | 12/1996 | Kale et al. | |
| 5,721,025 A | 2/1998 | Falla et al. | |
| 5,733,155 A | 3/1998 | Sagawa et al. | |
| 5,854,045 A | 12/1998 | Fang et al. | |
| 6,407,191 B1 * | 6/2002 | Mezquita et al. | 526/227 |
| 7,741,415 B2 | 6/2010 | Conrad et al. | |
| 2006/0281866 A1 * | 12/2006 | Oswald et al. | 525/240 |

FOREIGN PATENT DOCUMENTS

EP  0 069 806 A1  1/1983

OTHER PUBLICATIONS

Hawley's Condensed Chemical Cictionary, 14th edition (2002).*
Mourey, Thomas H., et al., A Stratefy for Interpreting Multidetector Size-Exclusion Chromatography Data I, Chromatography of Polymers, 1993, pp. 180-198.
Balke, Stephen T., et al., A Strategy for Interpreting Multidetector Size-Exclusion Chromatography Data II, Chromatography of Polymers, 1993, pp. 199-219.
Zimm, Bruno H., Apparatus and Methods for Measurement and Interpretation of the Angular Variation of Light Scattering; Preliminary Results on Polystyrene Solutions, The Journal of Chemical Physics, 1948, pp. 1099-1116, vol. 16 No. 12.
Kratochvil, P., Some Other Applications of Light Scattering, Classical Light Scattering from Polymer Solutions, 1987, pp. 237-255, Chpt. 6, Elsevier, New York.
Kratochvil, P., Polyethylene, Classical Light Scattering from Polymer Solutions, 1987, pp. 302-307, Chpt. 7, Elsevier, New York.

* cited by examiner

*Primary Examiner*—Vasu Jagannathan
*Assistant Examiner*—Mark S Kaucher

(57) ABSTRACT

The instant invention is an improved low-density ethylenic polymer composition and method of making the same. The polymer composition according to instant invention includes a major component, and a minor component. The major component is an LDPE resin having a melt index ($I_2$) in the range of about 0.01 dg/min to about 100 dg/min, a $M_{W(abs)}/M_{W(GPC)}$ ratio of about 2.6 or less, and a melt strength of less than $(14.0\ e^{(-1.05 * \log 10(MI))})$cN Jj16 mmor component is an LDPE resin having a melt index ($I_2$) of less than about 5 dg/min, a molecular weight distribution of greater than about 7, and a $M_{W(abs)}/M_{W(GPC)}$ ratio of at least 2.7. The polymer composition of the instant invention may further include additional components.

11 Claims, No Drawings

LOW DENSITY ETHYLENIC POLYMER COMPOSITION AND METHOD OF MAKING THE SAME

CROSS-REFERENCE TO RELATED APPLICATIONS

This application is claiming priority from U.S. Provisional Application Ser. No. 60/658,962, filed on Mar. 4, 2005 entitled "LOW DENSITY ETHYLENIC POLYMERIC COMPOSITIONS WITH IMPROVED PROCESSIBILITY," the teachings of which are incorporated by reference herein as if reproduced in full hereinbelow.

FIELD OF INVENTION

The instant invention relates to an improved low-density ethylenic polymeric composition and method of making the same.

BACKGROUND OF THE INVENTION

Producing films from polyethylene ("PE") resins via melt blown film process (also know as bubble process) is generally known. In the melt blown process, bubble stability is an important factor because it restricts the film production rate. Furthermore, the bubble stability is directly related to melt strength ("MS") of the resin.

It is also generally known that high pressure low density polyethylene ("LDPE") inherently possesses a higher melt strength than linear polyethylene ("LPE"). Therefore, LDPE is particularly useful in blowing large diameter thick gauge bubbles.

LDPE production may be facilitated via different methods including, but not limited to, autoclave process or tubular process. Although autoclave LDPE resins may possess a high melt strength, films produced from such resins fail to exhibit the same level of toughness exhibited by the films produced from tubular LDPE resins having the same melt index ("MI") as the autoclave LDPE resins. Furthermore, although the LDPE resin production via a tubular process, i.e. using a tubular reactor, can provide a higher ethylene conversion as compared to autoclave process; however, the melt index of a tubular resin must be significantly lowered compared to an autoclave resin in order to achieve the same melt strength as the autoclave resin; hence, this may consequently affect the production rate negatively.

European Patent Publication No. 0 069 806 A1 discloses a process for producing polyethylene having constant physical and chemical properties.

U.S. Provisional Application No. 60/624,434 discloses a process for producing low density polyethylene compositions and polymers produced therefrom.

Despite the research efforts in developing and improving resins of high melt strength, there is still a need for a resin of high melt strength suitable for high throughput film production.

SUMMARY OF THE INVENTION

The instant invention is an improved low-density ethylenic polymer composition and method of making the same. The polymer composition according to instant invention includes a major component, and a minor component. The major component is an LDPE resin having a melt index ($I_2$) in the range of about 0.01 dg/min to about 100 dg/min, a $M_{w(abs)}/M_{w(GPC)}$ ratio of about 2.6 or less, and a melt strength of less than (14.0 $e^{(-1.05*log\,10(MI))}$) cN. The minor component is an LDPE resin having a melt index ($I_2$) of less than about 5 dg/min, a molecular weight distribution of greater than about 7, and a $M_{w(abs)}/M_{w(GPC)}$ ratio of at least 2.7. The polymer composition of the instant invention may further include additional components. Furthermore, the free radical initiation polymerization process according to instant invention includes the following steps: providing ethylene; and reacting the ethylene in a reactor system, which includes at least one tubular reactor and at least one autoclave reactor, at a high pressure range of about 18,000 psig to about 55,000 psig, at a reactor temperature of about 190° C. to about 400° C., wherein the ethylene feed into the reactors is divided into multiple ethylene feed streams, and at least one of the ethylene feed streams into the tubular reactor consists essentially of the unreacted ethylene. Additionally, the free radical initiation polymerization process according to instant invention may further include the steps of providing at least one or more comonomers; and reacting the ethylene and the comonomer(s) in the reactor system at a high pressure range of about 18,000 psig to about 55,000 psig, at a reactor temperature of about 190° C. to about 400° C.

DETAILED DESCRIPTION OF THE INVENTION

The instant invention relates to an improved low-density ethylenic polymer composition and method of making the same.

The following terms shall have the given meaning for the purposes of this invention:

Melt strength, as used herein, refers to the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E.

Polymer, as used herein, refers to a polymeric compound prepared by polymerizing monomers, whether of the same or a different type. The generic term polymer, thus, includes the term "homopolymers," which refers to polymers prepared from only one type of monomer, as well as "copolymer," which refers to polymers prepared from two or more different monomers.

The term "LDPE," which may also be referred to as "high pressure ethylene polymer," "high pressure low density type resin," or "highly branched polyethylene," is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "Linear PE" or "LPE," as used herein, refers to any linear, substantially linear or heterogeneous polyethylene copolymer or homopolymer. The Linear PE can be made by any process such as gas phase, solution phase, or slurry or combinations thereof. The Linear PE may consist of one or more components, each of which is also a Linear PE.

The term molecular weight distribution or "MWD," as used herein, refers to the ratio of weight average molecular weight ($M_w$) to number average molecular weight ($M_n$), i.e. ($M_w/M_n$).

$M_{w(abs)}/M_{w(GPC)}$ ratio, as used herein, refers to the ratio of $M_{w(abs)}$ to $M_{w(GPC)}$; wherein $M_{w(abs)}$ is the weight average molecular weight derived from the light scattering area at low angle (such as 15 degrees) and injected mass of polymer, and the $M_{w(GPC)}$ is the weight average molecular weight obtained from a GPC calibration. The light scattering detector is calibrated to yield the equivalent weight average molecular weight as the GPC instrument for a linear polyethylene homopolymer standard such as NBS1475.

The low density polymer composition according to instant invention includes a major component, and a minor component.

The major component may be any polyolefin. Preferably, major component may be an ethylene polymer, e.g. a high pressure low density polyethylene ("LDPE"). The major component may have any melt index ($I_2$); for example, major component may preferably have a melt index ($I_2$) in the range of about 0.01 to about 100 dg/min. More preferably, major component may have a melt index ($I_2$) in the range of about 0.1 to about 5.0 dg/min, and most preferably, in the range of about 0.2 to about 2.0 dg/min. The major component may have any melt strength; for example, the major component may have a melt strength of less than $(14.0\, e^{(-1.05*log\,10(MI))})$ cN. The major component may have any $M_{w(abs)}/M_{w(GPC)}$ ratio; for example, the major component may have a $M_{w(abs)}/M_{w(GPC)}$ ratio of less than 2.6. The major component may have any density; for example, the major component may have a density in the range of about 0.917 to about 0.935 g/cm$^3$.

The minor Component may be any polyolefin. Preferably, minor component may be an ethylene polymer, e.g. a high pressure low density polyethylene ("LDPE"). The minor component may have any melt index ($I_2$); for example, the minor component may have a melt index ($I_2$) of less than about 5.0 dg/min. Preferably, the minor component may have a melt index ($I_2$) in the range of about 0.1 to about 2.0 dg/min; more preferably, a melt index ($I_2$) in the range of about 0.2 to about 1.0 dg/min; and most preferably, a melt index ($I_2$) in the range of about 0.2 to about 0.7 dg/min. The minor component may have any molecular weight distribution ("MWD"); for example, minor component may preferably have a molecular weight distribution of greater than 7. More preferably, minor component may have a molecular weight distribution of greater than 10. Minor component may have any $M_{w(abs)}/M_{w(GPC)}$ ratio; for example, minor component may have a $M_{w(abs)}/M_{w(GPC)}$ ratio of at least 2.7. Preferably, minor component may have a $M_{w(abs)}/M_{w(GPC)}$ ratio of greater than 3; and most preferably, the minor component may have a $M_{w(abs)}/M_{w(GPC)}$ ratio of greater than 3.5. The minor component may have any density; for example, the minor component may have a density in the range of about 0.917 to about 0.935 g/cm$^3$.

The polymer composition of the instant invention may comprise from about 1 to about 49 percent by weight of the minor component, based on the total weight of both major and minor components. Preferably, the polymer composition may comprise from about 3 to about 25 percent by weight of the minor component, based on the total weight of both major and minor components; and most preferably, the polymer composition may comprise from about 5 to about 15 percent by weight of the minor component, based on the total weight of both major and minor components. Furthermore, the polymer composition may comprise from about 1 to about 100 percent by weight of both major and minor components, based on the weight of the polymer composition, and the remaining thereof may be any other additional component, as described below. The polymer composition may have any melt index ($I_2$); for example, the polymer composition may preferably have a melt index ($I_2$) in the range of about 0.01 to about 100.0 dg/min; and more preferably, a melt index ($I_2$) in the range of 0.1 to about 10.0 dg/min. The polymer composition may have any melt strength; for example, the polymer composition may have a melt strength of greater than $f*(14.0\, e^{(-1.05*log\,10(MI))})$; wherein f=1, preferably f=1.1, and most preferably f=1.2; and wherein MI is the melt index ($I_2$) of the polymer composition. The polymer composition may have any $M_{w(abs)}/M_{w(GPC)}$ ratio; for example, the polymer composition may preferably have a $M_{w(abs)}/M_{w(GPC)}$ ratio of greater than $\{1.2+(7(M_w/10^6))\}$. The polymer composition may have any molecular weight distribution (MWD); for example, the polymer composition may preferably have a molecular weight distribution of less than $\{3.0+(4(M_w/10^5))\}$. The polymer composition may have any density; for example, the polymer composition may have a density in the range of about 0.86 to about 0.96; or in the alternative, the polymer composition may have a density in the range of about 0.917 to about 0.935 g/cm$^3$.

The polymer composition may further include additional components including, but not limited to, antioxidants, slip agents, antiblock agents, UV-stabilizers, additives, natural polymers, synthetic polymers such as linear polyethylene polymers, substantially linear polyethylene, homogenously branched linear ethylene polymer compositions, heterogeneously branched ethylene polymers, and blends thereof. Substantially linear polyethylene polymers are further discussed in U.S. Pat. Nos. 5,272,236; 5,278,272; 5,582,923; and 5,733,155. The homogeneously branched linear ethylene polymer compositions are further discussed in the U.S. Pat. No. 3,645,992. The heterogeneously branched ethylene polymers are further discussed in the U.S. Pat. Nos. 4,076,698, 3,914,342, and 5,854,045. The LPE can be made via gas-phase, solution-phase or slurry polymerization, or any combination thereof, using any type of reactor or reactor configuration known in the art, and it may further be modified by any means known in the art, e.g. melt strength enhancement using e-beam, peroxide coupling, oxygen tailoring, and etc.

In production, the polymer composition of the instant invention may be produced via different methods, for example via blending, parallel reactors, and autoclave-tubular reactors in series.

The polymer composition of the instant invention may produced via blending. Blending process is generally well known. In general, the individual components, i.e. major component and minor component, may be produced individually, and then blended to produce the polymer composition of the instant invention.

In the alternative, the polymer composition of the instant invention may be produced via parallel reactors. The use of parallel reactors is generally known. In general, the individual components, i.e. major component and minor component, are simultaneously produced via parallel reactors, and blended to form the polymer composition of the instant invention after pressure let-down of the reactors.

In another alternative, the polymer composition of the instant invention may produced via autoclave-tubular reactors in series. There may one or more of the autoclave-tubular reactors in series. The instant process is described in terms of a single autoclave-tubular reactor, however, the instant process is not limited to a single autoclave-tubular reactor, e.g. multiple autoclave-tubular reactors in series. When a single autoclave-tubular reactor is used, the process may preferably include a free radical initiation polymerization process. The free radical initiation polymerization may include the following steps: providing ethylene; and reacting the ethylene in a reactor system, which includes at least one tubular reactor and at least one autoclave reactor, at a high pressure range of about 18,000 psig to about 55,000 psig, at a reactor temperature of about 190° C. to about 400° C., wherein the ethylene feed into the reactors is divided into multiple ethylene feed streams, and at least one of the ethylene feed streams into the tubular reactor consists essentially of the unreacted ethylene. Additionally, the free radical initiation polymerization process according to instant invention may further include the steps of providing at least one or more comonomers; and reacting the ethylene and the comonomer(s) in the reactor system at a high pressure range of about 18,000 psig to about 55,000 psig, at a reactor temperature of about 190° C. to about 400° C. The reactor temperatures may preferably be in the range of about 200° C. to about 350° C., and more preferably in the range of about 210° C. to about 320° C., and most preferably in the range of about 220° C. to about 300° C. The autoclave and tubular reactors are preferably operated in series in that sequential order, wherein the maximum ethylene feed stream split to the tubular reactor is defined by $y=1-(0.35)^x$; wherein y represents the maximum fractional feed to the tubular reactor, and x represents the total number of ethylene feed streams to the tubular reactor. Each ethylene feed stream may preferably be maintained at a temperature lower than the reactor temperature. The temperature of the tubular reactor after each free radical initiator injection may reach a peals temperature of at least 250° C. The tubular reactor peak temperature, as used herein, refers to the maximum temperature achieved in the tubular reactor after free radical initiators are injected. The polymer composition of the instant invention may be produced preferably via splitting the ethylene feed between the autoclave reactor and the tubular reactor. However, the polymer composition of the instant invention may also be produced by directing all of the ethylene feed into the autoclave reactor. Splitting the ethylene feed between the autoclave reactor and the tubular reactor facilitates an improved control of the molecular weight distribution for a given weight molecular weight resin. The splitting of the ethylene feed between the autoclave reactor and the tubular reactor facilitates the optimization in melt strength, long chain branching, molecular weight distribution, rheology, density and total conversion while simultaneously facilitating the desired conversion split between the reactors because the autoclave reactor may be operated at any temperature. The splitting of the ethylene feed facilitates the production of the polymer compositions with higher melt strength and long chain branching while producing a substantial portion of the polymer composition in the tubular reactor section of the autoclave-tubular reactor configuration because it facilitates the independent control of the molecular weight distribution at a given molecular weight. Thus, this process is particularly suitable for producing resins with uniquely broad molecular weight distribution for a given molecular weight. Furthermore, the use of autoclave-tubular reactor to produce the polymer composition of the instant invention is advantageous over the blending process because this process facilitates the elimination of the need for handling multiple resins, and extruding condition that may cause gel formation.

The polymer composition of the instant invention may also be produced via an autoclave-tubular reactor, as described above, such that the average reactor temperature of the autoclave minimally follows the function $Y=(0.006 P+85)$; where Y is the average autoclave reactor temperature in ° C. and P is the autoclave reactor pressure in psig. The average autoclave reactor temperature is determined according to the following equation: Average autoclave reactor temperature=$\Sigma$(weight fraction made at $T_i$). $(T_i)$; where $T_i$ is the maximum temperature in reaction zone i, and i is at least 1.

Furthermore, the polymer composition of the instant invention may also be produced via an autoclave-tubular reactor, as described above, under the following conditions: F is greater than or equal to $(0.021*Y^2)-((9.48*Y)+1318)$; where $F=((X*Z)+((1-X)*Y)$, and where X represents the fraction of the total polymer converted in the tubular reactor, and where Z represents the maximum reactor temperature achieved in the tubular reactor in ° C.

In application, the polymer composition of the instant invention may be used for any application or process where the increased melt strength at a given melt index is an advantage, including, but not limited to, cast and blown film, thermoforming, blow molding, foam manufacture, extrusion coating.

The high melt strength autoclave resin may be added to tubular LDPE of a range of melt indices, selected depending on the end use thus allowing higher production rates for applications such as shrink film (~0.7 MI), general purpose film (~2.0 MI), clarity film (~2.0 MI) and other uses. Often the converter will blend the LDPE with linear polyethylene (LPE) to increase the physical properties of the final film produced. The resulting blend may have a lower maximum processing rate—this is usually attributed to the relatively low melt strength of the LPE (linear or substantially linear polyethylene) compared to LDPE. Thus by providing a new LDPE which exhibits a higher onset of bubble instability, this invention allows the converter to either blend in more LPE or run at higher rates than otherwise possible, or a combination of both. In the autoclave-tubular aspect of the invention, the resin so produced may be of any melt index for which tubular resins are normally used, but with the enhanced melt strength providing the ability to run at higher rates or facilitating for further blending with more LPE than current technology allows or a combination of both. In another aspect of this invention, a minor amount of LDPE can be added to a LPE to increase the processing rate of the LPE—this typically comes at the expense of reducing the physical properties of the LPE (tear, puncture, abuse resistance etc); thus, it is advantageous to provide a LDPE with more capability to stabilize the LPE bubble; hence, requiring less LDPE to be incorporated, therefore providing a final blend with less degradation of physical properties than heretofore. The converter can choose to use the same level of LPDE as previously and achieve higher production rates, less LDPE than previously and achieve better physical performance or a combination of both.

Test Methods

Test methods include the following:

Melt strength values, reported in centi-Newtons (cN), are determined using a Göttfert Rheotens. The air gap, i.e. the distance from the die exit to the take-up wheels, is set to 100 ml, and the wheels acceleration is 2.4 mm/s². The melt is produced by a Göttfert Rheotester 2000 at 190° C. unless otherwise specified, equipped with a 12 mm barrel and a die with flat entrance (L=30 mm and ØID=2 mm) at a piston speed of 0.265 mm/s.

Density is tested in accordance with ASTM D792.

Melt index is tested at 190° C. according to ISO 1133: 1997 or ASTM D1238: 1999; $I_2$ is measured with a 2.16 kg weight. Numbers are reported in gram per 10 minutes, or dg/min.

Weight average molecular weight ($M_w$) and number average molecular weight ($M_n$) are determined according to methods known in the art using conventional GPC.

Gel Permeation chromatography "GPC" method, as described hereinbelow, was employed to obtain MWD and $M_{w(abs)}/M_{w(GPC)}$ ratio:

The chromatographic system consisted of a Waters (Millford, Mass.) 150 C high temperature chromatograph equipped with a Precision Detectors (Amherst, Mass.) 2-angle laser light scattering detector Model 2040. The 15-degree angle of the light scattering detector was used for the calculation of molecular weights. Data collection was performed using Viscotek (Houston, Tex.) TriSEC software version 3 and a 4-channel Viscotek Data Manager DM400. The system was equipped with an on-line solvent degas device from Polymer Laboratories (Shropshire, UK).

The carousel compartment was operated at 140° C. and the column compartment was operated at 150° C. The columns used were 7 Polymer Laboratories 20-micron Mixed-A LS columns. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen-sparged. Polyethylene samples were stirred gently at 160 degrees Celsius for 4 hours. The injection volume used was 200 microliters and the flow rate was 1.0 milliliters/minute.

Calibration of the GPC column set was performed with 18 narrow molecular weight distribution polystyrene standards with molecular weights ranging from 580 to 8,400,000 which were arranged in 5 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)):

$$M_{polyethylene} = A \times (M_{polystyrene})^B$$

Where M is the molecular weight, A has a value of 0.41 and B is equal to 1.0. A fourth order polynomial was used to fit the respective polyethylene-equivalent calibration points.

The total plate count of the GPC column set was performed with Eicosane (prepared at 0.04 g in 50 milliliters of TCB and dissolved for 20 minutes with gentle agitation.) The plate count and symmetry were measured on a 200 microliter injection according to the following equations:

$$PlateCount = (5.54)(RV \text{ at Peak Maximum}/(Peak \text{ width at } \frac{1}{2} height))^2$$

Where RV is the retention volume in milliliters and the peak width is in milliliters.

$$Symmetry = (Rear \text{ peak width at one tenth height} - RV \text{ at Peak maximum})/(RV \text{ at Peak Maximum} - Front \text{ peak width at one tenth height})$$

Where RV is the retention volume in milliliters and the peak width is in milliliters.

The Systematic Approach for the determination of multi-detector offsets was done in a manner consistent with that published by Balke, Mourey, et. al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log MW results from Dow broad polystyrene 1683 to the narrow standard column calibration results from the narrow standards calibration curve using in-house software. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing $2^{nd}$ Virial coefficient effects (concentration effects on molecular weight).

In order to monitor the deviations over time, which may contain an elution component (caused by chromatographic changes) and a flow rate component (caused by pump changes), a late eluting narrow peak is generally used as a "marker peak". A flow rate marker was therefore established based on the air peak mismatch between the degassed chromatographic system solvent and the elution sample on one of the polystyrene cocktail mixtures. This flow rate marker was used to linearly correct the flow rate for all samples by alignment of the air peaks. Any changes in the time of the marker peak are then assumed to be related to a linear shift in both flow rate and chromatographic slope.

To facilitate the highest accuracy of a retention volume (RV) measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (as a measurement of the calibration slope) is calculated as Equation 1. In a high-temperature SEC system, an antioxidant mismatch peak or an air peak (if the mobile phase is sufficiently degassed) can be used as an effective flow marker. The primary features of an effective flow rate marker are as follows: the flow marker should be mono-dispersed. The flow marker should elute close to the total column permeation volume. The flow marker should not interfere with the chromatographic integration window of the sample.

$$FlowRateEffective = (FlowRateNominal)(FlowMarkerCalibration/FlowMarkerObserved) \quad \text{Equation 1}$$

The preferred column set is of 20 micron particle size and "mixed" porosity to adequately separate the highest molecular weight fractions appropriate to the claims.

The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) with approximately equivalent peak heights. There should be adequate separation by demonstrating a trough height between the two peaks less than half of the total LS peak height. The plate count for the chromatographic system (based on eicosane as discussed previously) should be greater than 32,000 and symmetry should be between 1.00 and 1.12.

EXAMPLES

The following examples illustrate the present invention but are not intended to limit the scope of the invention.

Resin used in examples (MI=$I_2$, dg/min):
R1: LDPE 203M (Dow) –0.3 MI, 0.921 g/cc (tubular LOPE)
R2: LDPE 662i (Dow) –0.47 MI, 0.918 g/cc (autoclave LDPE: $M_{w(abs)}/M_{w(GPC)}$ ratio=3.7; MWD=9.1)
R3: DOWLEX NG 2085B (Dow) –0.85 MI, 0.920 g/cc (LPE)
R4: LDPE 204M (Dow) –0.3 MI, 0.921 g/cc (tubular LDPE)

R5: DOWLEX 2045 (Dow) –1.0 MI, 0.920 g/cc (LPE)
R6: LDPE 132i (Dow) –0.22 MI, 0.921 g/cc (tubular LDPE: MS=20 cN; $M_{w(abs)}/M_{w(GPC)}$ ratio=2.28)
White/Black MB are pigments in a LPE base of MI=20

Example 1-2

Demonstrating the utility of the invention in a large diameter, thick gauge, multi-layer high throughput commercial application for agricultural silage film.

Resins for each layer mixed by dry-blending and compounded during the extrusion to the die.

Coex structure A/B/C (33/34/33); Film gauge=238 microns (9.4 mil); die=142.2 cm (56 inches); BUR=2.0.
  A: R1 (32%)+R2 (5%)+R3 (55%)+whiteMB (8%)
  B: R1 (32%)+R2 (5%)+R3 (56%)+whiteMB (7%)
  C: R1 (35%)+R2 (5%)+R3 (52%)+blackMB (8%)

Inventive Example 1

Maximum output=1000 kg/hr.

Comparative Example 2

In case with no R2 (balance made up by increase R1) maximum output=960 kg/hr.

Examples 3-4

Demonstrating the utility of the invention in a large diameter, thick gauge, multi-layer high throughput commercial application for agricultural silage film.

Resins for each layer mixed by dry-blending and compounded during the extrusion to the die.

Coex structure A/B/C (33/34/33); Die diameter=1.2 m (3.9 ft); Bubble diameter=2.77 m (9 ft), gauge 228 microns (9.0 mil).
  A: R4 (62%)+R2 (8%)+R3 (18%)+whiteMB (12%)
  B: R4 (65%)+R2(8%)+R3 (19%)+whiteMB (8%)
  C: R4 (52%)+R2 (8%)+R3 (300%)+blackMB (10%)

Inventive Example 3

Operated at production rate of 900 kg/hr.

Comparative Example 4

% R2=0, balance made up by increase in % R4; Production rate of 900 kg/hr could not be achieved as bubble would collapse before reaching 900 kg/hr.

In absence of R2 (balance made up by increase in R4), bubble collapsed at desired production rate. With R2, stable bubble formed.

Examples 5-10

Demonstrating the utility of the invention both in the presence and absence of LPE as a third component in small scale laboratory equipment. One expression of bubble instability is "breathing" whereby the layflat and hence the gauge of the film varies. The effectiveness of the invention is measured as a reduction in layflat variance compared to non-inventive examples containing no high melt strength LDPE (resin R2). The experiment is performed creating a bubble of maximum gauge possible on the equipment by maximizing the extruder production rate, minimizing the take-off rate and utilizing a very low blow-up ratio (BUR). Under these conditions, high chilled cooling air flow is required to achieve a stable bubble. In the equipment used, a flow of 93 cu ft/min at 45° F. was required. Having achieved a stable bubble with this condition, the air flow was reduced to 58 cu ft/min and the variation in layflat measured after five minutes. A fixed time is required as the layflat variation typically increases with time until the bubble fails. These examples show that the inventive composition is particularly effective in the presence of LPE.

Monolayer structures. Where required, resins dry-blended and compounded during extrusion.

Extruder: 2 inches diameter, L/D=24:1, melt temperature=444° F.;

Die-diameter=3 inches; Die-gap=70 mil; BUR=1.35 Production rate=56 lb/hr; take-off rate=18 ft/min;

Layflat variation measured with chilled air flow at 58 ft³/min, temperature=45-50° F.

| Example | Blend composition | | | Layflat variation (in) | | |
|---|---|---|---|---|---|---|
| | % R5 | % R2 | % R6 | Max | Min | Variance |
| Comp 5 | 0 | 0 | 100 | 7.75 | 4.75 | 3 |
| Inv 6 | 0 | 5 | 95 | 7.375 | 5.125 | 2.25 |
| Inv 7 | 0 | 20 | 80 | 7 | 5.625 | 1.375 |
| Comp 8 | 20 | 0 | 80 | 6.5 | 5.5 | 1 |
| Inv 9 | 20 | 5 | 75 | 6.785 | 6 | 0.785 |
| Inv 10 | 20 | 10 | 70 | 6.625 | 6.125 | 0.5 |

We claim:

1. A composition comprising:
a major component, wherein said major component comprising a high pressure highly branched LDPE resin having a melt index (MI) tested at 190° C. ASTM D1238: 2.16 kg weight dg/minute in the range of about 0.01 dg/min to about 100 dg/min, a $M_{w(abs)}/M_{w(GPC)}$ ratio of about 2.6 or less, and a melt strength of less than $(14.0\ e^{(-1.05*log\ 10(MI))})$ cN; and
a minor component, wherein said minor component comprising a high pressure highly branched LDPE resin having a melt index (MI) tested at 190° C. ASTM D1238: 2.16 kg weight dg/minute of less than about 5 dg/min, a molecular weight distribution of greater than about 7, and a $M_{w(abs)}/M_{w(GPC)}$ ratio of at least 2.7.

2. The composition according to claim 1, wherein said minor component having a melt index (MI) tested at 190° C. ASTM D1238: 2.16 kg weight dg/minute in the range of about 0.1 dg/min to about 2.5 dg/min, and a $M_{w(abs)}/M_{w(GPC)}$ ratio of greater than about 3.0.

3. The composition according to claim 1, wherein said minor component having a melt index in the range of about 0.2 dg/min to about 1.0 dg/min, and a $M_{w(abs)}/M_{w(GPC)}$ ratio of greater than about 3.5.

4. The composition according to claim 1, wherein said composition comprising from about 1 to about 49 percent by weight of the minor component, based on the total weight of said major and minor components.

5. The composition according to claim 4, wherein said composition comprising from about 5 to about 30 percent by weight of the minor component, based on the total weight of said major and minor components.

6. The composition according to claim 4, wherein said composition comprising from about 10 to about 25 percent by weight of the minor component, based on the total weight of said major and minor components.

7. The composition according to claim 1, wherein said composition comprising from about at least 1 to about 100 percent by weight of both said major and minor components, based on the total weight of said composition.

8. The composition according to claim 1, wherein the melt strength of said composition being greater than $(1.1)(14.0 e^{(-1.05 * log\ 10(MI))})$ cN.

9. The composition according to claim 1, wherein the melt strength of said composition being greater than $(1.2)(14.0 e^{(-1.05 * log\ 10(MI))})$ cN.

10. The composition according to claim 1, wherein said composition further comprising a linear polyethylene.

11. An article comprising:
   a polymer composition comprising;
      a major component, wherein said first component being a high pressure highly branched LDPE resin having a melt index (MI) tested at 190° C. ASTM D1238: 2.16 kg weight dg/minute in the range of about 0.01 dg/min to about 100 dg/min, a $M_{w(abs)}/M_{w(GPC)}$ ratio of about 2.6 or less, and a melt strength of less than $(14.0 e^{(-1.05 * log\ 10(MI))})$ cN; and
   a minor component, wherein said second component being a high pressure highly branched LDPE resin having a melt index (MI) tested at 190° C. ASTM D1238: 2.16 kg weight dg/minute of less than about 5 dg/min, a molecular weight distribution of greater than about 7, and a $M_{w(abs)}/M_{w(GPC)}$ ratio of at least 2.7.

* * * * *